(12) United States Patent
Manfredi et al.

(10) Patent No.: US 8,689,944 B2
(45) Date of Patent: Apr. 8, 2014

(54) CONTROL OF AN ELECTRICITY SUPPLY APPARATUS IN AN ELEVATOR SYSTEM

(71) Applicant: Kone Corporation, Helsinki (FI)

(72) Inventors: Mirco Manfredi, Crevalcore (IT); Sara Maria Rosaria Ruggieri, Milan (IL); Alessandro Pilone, Espoo (FI); Claudio Donghi, Cesano Maderno (IT); Francesco Burroni, Bologna (IT)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/747,021

(22) Filed: Jan. 22, 2013

(65) Prior Publication Data

US 2013/0133987 A1 May 30, 2013

Related U.S. Application Data

(63) Continuation of application No. PCT/FI2010/050651, filed on Aug. 18, 2010.

(30) Foreign Application Priority Data

Aug. 17, 2010 (WO) .................. PCT/FI2010/050646

(51) Int. Cl.
   *B66B 1/06* (2006.01)
(52) U.S. Cl.
   USPC ......................................... 187/289; 187/391
(58) Field of Classification Search
   USPC .............. 187/247, 277, 290, 293, 296, 297, 187/391–393, 289; 307/66, 69; 318/799–815
   See application file for complete search history.

(56) References Cited

U.S. PATENT DOCUMENTS

| 4,083,431 | A  | * | 4/1978  | Oohira et al. | 187/296 |
| 4,122,919 | A  | * | 10/1978 | Anzai | 187/296 |
| 5,058,710 | A  | * | 10/1991 | Iwasa | 187/290 |
| 5,896,948 | A  | * | 4/1999  | Suur-Askola et al. | 187/290 |
| 6,315,081 | B1 | * | 11/2001 | Yeo | 187/290 |
| 6,460,658 | B2 | * | 10/2002 | Suga et al. | 187/290 |
| 6,827,182 | B2 | * | 12/2004 | Araki | 187/290 |
| 7,650,968 | B2 | * | 1/2010  | Oesterle et al. | 187/290 |
| 7,775,328 | B2 | * | 8/2010  | Robledo Barrio et al. | 187/290 |
| 8,146,714 | B2 | * | 4/2012  | Blasko | 187/290 |
| 8,230,978 | B2 | * | 7/2012  | Agirman et al. | 187/290 |
| 8,333,265 | B2 | * | 12/2012 | Kang et al. | 187/289 |
| 2007/0295566 | A1 | | 12/2007 | Lindegger | |
| 2011/0290593 | A1 | * | 12/2011 | Kauppinen et al. | 187/290 |
| 2013/0015021 | A1 | * | 1/2013  | Stolt et al. | 187/305 |

FOREIGN PATENT DOCUMENTS

| EP | 1496526 A2 | 1/2005 |
| WO | WO 2007/017618 A1 | 2/2007 |
| WO | WO 2008/027052 A2 | 3/2008 |

* cited by examiner

*Primary Examiner* — Anthony Salata
(74) *Attorney, Agent, or Firm* — Birch, Stewart, Kolasch & Birch, LLP

(57) ABSTRACT

The invention relates to an electricity supply apparatus, an elevator system and a method for limiting the electricity consumption of an elevator system. The electricity supply apparatus according to the invention is fitted to supply electricity to one or more devices in an elevator system. The minimum value of the permitted supply voltage with which the apparatus still operates is determined for one or more appliances of the elevator system, and the electricity supply apparatus is equipped to change the supply voltage of the one or more appliances of the elevator system towards the minimum value of the permitted supply voltage for limiting electricity consumption of the elevator system.

14 Claims, 4 Drawing Sheets

CONTROL OF AN ELECTRICITY SUPPLY APPARATUS IN AN ELEVATOR SYSTEM

CROSS REFERENCE TO RELATED APPLICATIONS

This application is a continuation of PCT/FI2010/050651 filed on Aug. 18, 2010, which claims priority under 35 U.S.C. 119(a) to Patent Application No. PCT/FI 2010/050646 filed in the Finland on Aug. 17, 2010, all of which are hereby expressly incorporated by reference into the present application.

FIELD OF THE INVENTION

The invention relates to solutions for limiting the electricity consumption of elevators.

BACKGROUND OF THE INVENTION

Conventionally, it is endeavored to reduce electricity consumption in elevator systems by disconnecting the electricity supply at least in some of the electrical/electronic devices of the elevator system at points of time when the elevator is not in use or the use is very low.

For this reason an apparatus is added to the elevator system, which apparatus comprises a controller and also disconnection devices, such as switches, in connection with the controller, with which devices the electricity supply is disconnected in a controlled manner and the elevator system is switched to the power-saving mode.

This type of system is often very complex; a problem of the solution is also formed by the starting delays of the apparatus in connection with the restarting of the electricity supply, in which case recovery from the power-saving mode is often unnecessarily slow and impairs the use of the elevator.

SUMMARY OF THE INVENTION

The aim of the invention is thus to disclose a solution to the problem for limiting the electricity consumption of an elevator system while simultaneously minimizing the delays caused by recovery from the power-saving mode. To achieve this aim the invention discloses an electricity supply apparatus according to claim 1 and also an elevator system according to claim 10. The preferred embodiments of the invention are disclosed in the dependent claims.

The electricity supply apparatus according to the invention is adapted to supply electricity to one or more devices in an elevator system. The minimum value of the permitted supply voltage, with which value the device still operates, is also determined for one or more devices of the elevator system, and the electricity supply apparatus is configured to change the supply voltage of the aforementioned one or more devices of the elevator system towards the aforementioned minimum value of the permitted supply voltage for limiting the electricity consumption of the elevator system. In this case with the electricity supply apparatus the supply voltage of one or more devices of an elevator system can be reduced towards the minimum value of the permitted supply voltage such that the supply voltage will not, however, fall below the minimum value. Thus the device remains operational and ready-for-use also during the power-saving mode and there is no need to take into consideration delays caused by, among other things, the restarting of devices during the time when the elevator returns from the power-saving mode back to normal use. In addition, since the devices remain operational also during the power-saving mode, the same devices that are used during normal operation of the elevator can be used in the termination of the power-saving mode. One such device to be used in the termination of the power-saving mode can be e.g. an elevator control unit, with which movement of the elevator car is controlled as a response to elevator calls during normal operation of the elevator. With the elevator control unit the operating mode of an elevator can, for instance, be set in connection with the switching to power-saving mode/the termination of power-saving mode. Thus one advantage of the invention, in addition to saving energy, is also that the invention simplifies the control arrangement of the power-saving mode and also facilitates elevator use compared to prior art solutions, in which electricity consumption to one or more devices of an elevator system is totally disconnected during the power-saving mode.

The electricity supply apparatus according to the invention preferably comprises at least two outputs, and the electricity supply apparatus is configured to supply a constant voltage via the first output of said two outputs to one or more devices of the elevator system, and also simultaneously to change via the second output the voltage to be supplied to one or more devices of the elevator system towards the minimum value of the permitted supply voltage. This type of solution is advantageous e.g. when supplying voltage to devices, the operation of which, e.g. for the sake of safety, is so important that the voltage is not reduced during the power-saving mode.

The electricity supply apparatus preferably comprises a transformer, which comprises a primary and a secondary, and which secondary is connected to the electricity supply of one or more devices of the elevator system. The electricity supply apparatus also preferably comprises tap switches connected to the taps of the transformer and also a controller that is arranged to use the tap switches for changing the supply voltage of the aforementioned one or more devices of the elevator system towards the minimum value of the permitted supply voltage. The primary of the transformer is preferably connected to the alternating electricity source of the elevator. Additionally, the transformer preferably comprises a separate secondary, which is connected without tap switches to the electricity supply of one or more devices of the elevator system.

In one embodiment of the invention the tap switches are connected to the taps of the primary of the transformer.

In one embodiment of the invention the tap switches are connected to the taps of the secondary of the transformer.

The electricity supply apparatus according to the invention can also comprise an input for the control signal of the power-saving mode and for data about the voltage of the alternating electricity source of the elevator.

The elevator system according to the invention comprises means for setting the operating mode of the elevator system. The elevator system also comprises one of the electricity supply apparatuses according to the invention described above. The aforementioned electricity supply apparatus is arranged in a certain operating mode of the elevator system, preferably during the standstill of the elevator/standby mode of the elevator, to change the supply voltage of one or more devices of the elevator system towards the minimum value of the permitted supply voltage for limiting the electricity consumption of the elevator system. During the standstill/standby mode of the elevator, the reduction of the supply voltage towards the minimum value of the permitted supply voltage can also be easier owing to the fact that during normal operation of the elevator, and more particularly when the elevator accelerates in the heavy load drive direction, the current of the alternating electricity source of the elevator increases momentarily, which can cause changes in the voltage of the alternating electricity source. Such voltage changes could also cause variation in the supply voltage formed by the electricity supply apparatus.

The elevator system preferably comprises an elevator control unit for controlling the operation of the elevator as a response to elevator calls, and the electricity supply apparatus in the elevator system is preferably arranged to change the supply voltage of the elevator control unit towards the minimum value of the permitted supply voltage for limiting the electricity consumption of the elevator system.

In the method according to the invention for limiting the electricity consumption of an elevator system the operating mode of the elevator system is set, the minimum value of the permitted supply voltage with which the device still functions is defined for the supply voltage of one or more devices of the elevator system, and the supply voltage of one or more devices in a specified operating mode is adjusted towards the minimum value of the permitted supply voltage for limiting the electricity consumption of the elevator system.

The electricity supply apparatus according to the invention can also be installed in existing elevator systems, e.g. during modernization work of the elevator. Owing to the simplicity of the solution, it is also easy to add to the elevator plan without any significant need for additional planning.

The aforementioned summary, as well as the additional features and advantages of the invention presented below will be better understood by the aid of the following description of some embodiments, which do not limit the scope of application of the invention.

BRIEF EXPLANATION OF THE FIGURES

In the following, the invention will be described in more detail by the aid of some examples of its embodiments with reference to the attached figures, wherein.

MORE DETAILED DESCRIPTION OF PREFERRED EMBODIMENTS OF THE INVENTION

Embodiment 1

Figure 1A:
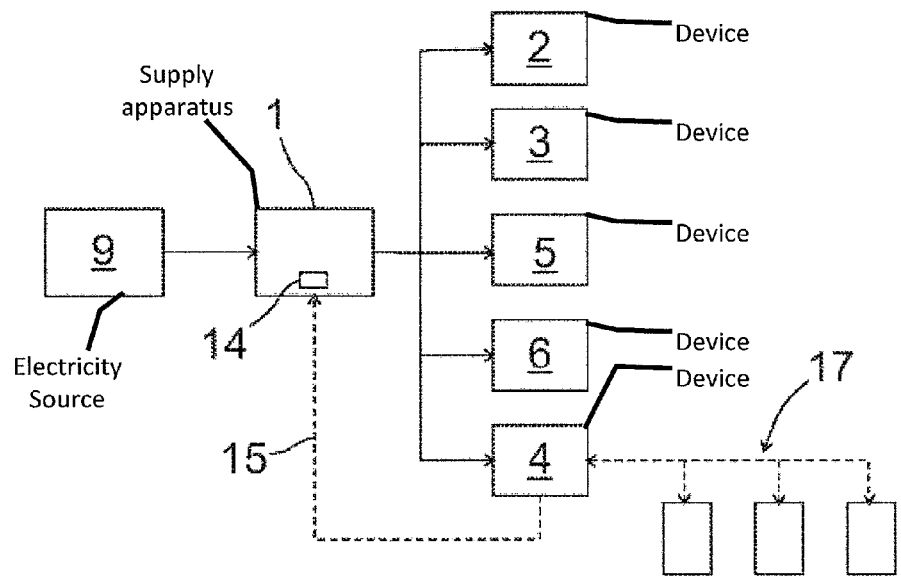
FIG. 1a presents a block diagram of an electricity supply circuit of an elevator system according to the first embodiment of the invention

FIG. 1a presents as a block diagram an electricity supply circuit of an elevator system, to which circuit an electricity supply apparatus 1 according to the invention is adapted. Electricity supply to the different devices 2, 3, 4, 5, 6 of the elevator system occurs from an alternating electricity source 9 via the electricity supply apparatus 1. The devices/device entities to be supplied by the electricity supply apparatus 1 comprise e.g. the electrical devices/electronic devices 2 of the elevator car, the electrical devices/electronic devices 3 of the elevator hoistway, the elevator control unit(s) 4, and the safety circuit 5, 6 of the elevator.

The safety circuit of the elevator comprises a safety circuit 5, which comprises safety switches measuring the position of the landing doors. The safety circuit also comprises e.g. a brake control circuit 6, with which the machinery brake of the hoisting machine is controlled by supplying current to the electromagnet of the machinery brake of the hoisting machine. Generally, the safety circuit also comprises other devices, such as sensors disposed in the proximity of the end zones of the elevator hoistway that determine the areas of permitted movement of the elevator car, sensors measuring the operation of the overspeed governor, and sensors measuring the operating mode of mechanical safety devices possibly disposed in the elevator hoistway. Electricity is normally supplied via the safety circuit 6 also to e.g. the control coils of the main contactors that disconnect the power supply to the hoisting machine of the elevator. Generally speaking, the safety circuit 6 of an elevator refers to those devices and connections that ensure that the operation of the elevator is safe in all operating situations, i.e. in addition to normal use of an elevator also e.g. in connection with installation and maintenance work of the elevator. Special requirements have been set for the safety circuit by regulations, relating to, among other things, creeping distances between wiring as well as to protective earthings; the electricity supply circuit of the safety circuit must normally be protectively-earthed.

One electrical device 2 of an elevator car can be e.g. an accumulator, with its battery charger, that is fitted onto the roof of the elevator car; also the lighting of the elevator car can be supplied via an electricity supply apparatus 1. The electronic devices 2 of an elevator car comprise e.g. call-giving devices and display devices and also positioning means of the elevator car. Other electrical/electronic devices of an elevator car include e.g. a door motor and also the control electronics and power electronics of the door motor.

The electricity supply for the lighting 3 of the elevator hoistway and for the other electrical devices of the elevator hoistway can also be supplied with the electricity supply apparatus 1; on the other hand, the supply cable for the lighting of the elevator hoistway is often taken directly from the alternating electricity source 9, bypassing the electricity supply apparatus 1. Other possible electrical devices 3 of an elevator hoistway can comprise e.g. cooling equipment and air-conditioning equipment. Electronic devices 3, such as monitoring cameras, etc., can also be disposed in the elevator hoistway. Call-giving devices disposed in connection with the landing doors on the stopping floors of the elevator car, the electricity supply cables and signal cables of which devices are often taken from one floor to another via the elevator hoistway, can also be included in this group.

The elevator control unit(s) 4 take(s) care of the control of the movement of the elevator car as a response to elevator calls that are given with call-giving devices 17.

Figure 4:
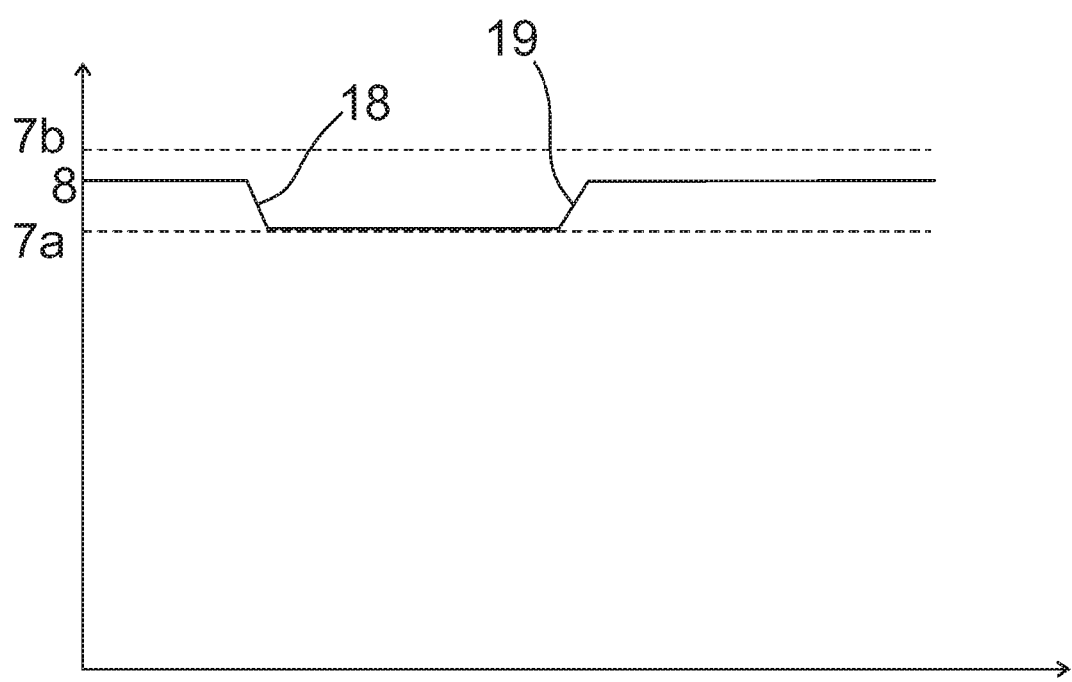
FIG. 4 illustrates a range of permitted supply voltage of one device of an elevator system.

A minimum value of the permitted supply voltage with which the device still operates is determined for the devices 2, 3, 4, 5, 6 of the elevator system, which devices are supplied by the electricity supply apparatus 1. To illustrate this, FIG. 4 presents a typical range of permitted supply voltage of one aforementioned device 2, 3, 4, 5, 6 of the elevator system. The permitted maximum value 7b of the supply voltage with which the device still operates reliably without malfunctioning can generally be set for the devices 2, 3, 4, 5, 6 of the elevator system; likewise the minimum value 7a of the supply voltage with which the device still remains operational and ready-for-use can be set for devices 2, 3, 4, 5, 6. For instance, the ranges of permitted voltage of the control coils of the contactors are usually selected such that the operation of the contactor control is still guaranteed at the minimum voltage, the magnitude of which is −15% of the nominal voltage of the electricity network, and the contactor can still be reliably used at least at a voltage that is +10% higher than the nominal voltage of the electricity network. A corresponding permitted voltage range is also set for other electrical devices and also for electronic devices, e.g. based on the specifications of the equipment supplier or on reliability measurements performed on the device. The permitted voltage ranges may vary substantially between different devices/device groups. In this case, however, a certain device-specific/device-group-specific nominal supply voltage can be set for each different device/device group, around which nominal supply voltage said device-specific/device-group-specific permitted voltage range is situated.

FIG. 4 illustrates a situation wherein the elevator control unit 4 switches the elevator system to the standby mode after detecting that a certain time has passed since the previous elevator call was received. In this context the elevator control unit 4 transmits an activation signal 15 of the power-saving mode to the electricity supply apparatus 1. After receiving the activation signal 15 of the power-saving mode the electricity supply apparatus 1 reduces the supply voltage 8 of the devices 2, 3, 4, 5, 6 of the elevator system from the nominal value of the supply voltage to the minimum value 7a of the permitted supply voltage at the moment of time 18. In this case the devices 2, 3, 4, 5, 6 to be supplied with the permitted minimum value 7a consume essentially less electrical power. To illustrate this it is assumed that the devices 2, 3, 4, 5, 6 to be supplied form a load that has a certain impedance Z, in which case the power consumption S of the device is proportional to the supply voltage U squared:

$$S = \frac{U^2}{Z}$$

The power consumption S is essentially of effective power P, particularly in those devices 2, 3, 4, 5, 6, the load of which is essentially resistive, e.g. owing to the resistance loads contained in the device (Z≅R).

After receiving a new elevator call from the call-giving devices 17, the elevator control unit 4 terminates the standby mode. In this case the elevator control unit 4 transmits a signal 15 to the electricity supply apparatus 1 for terminating the power-saving mode. The electricity supply apparatus 1 increases the supply voltage of the devices 2, 3, 4, 5, 6 of the elevator system from the minimum value 7a of the permitted supply voltage back to the nominal voltage at the moment of time 19 based on the termination signal 15 of the power-saving mode.

In another embodiment of the invention the elevator control unit 4 transmits an activation signal 15 of the power-saving mode to the electricity supply apparatus 1 immediately after detecting that the elevator car has landed on the stopping floor and transmits a termination signal of the power-saving mode only slightly before the next run starts, in which case the supply voltage of the devices 2, 3, 4, 5, 6 of the elevator system is reduced to the minimum value 7a of the permitted supply voltage for most of the standstill and thus the energy-saving to be achieved increases compared to before. This is enabled by the solution according to the invention because the devices 2, 3, 4, 5, 6 of the elevator system controlled to the power-saving mode remain ready-for-use also in the power-saving mode with the minimum value 7a of the permitted supply voltage, and in connection with the recovery from the power-saving mode there is no need to take into account the delays caused by, among other things, restarting the devices. Thus, e.g. the use of call-giving devices 17 that are controlled to the power-saving mode is also possible during the power-saving mode.

Figure 2:
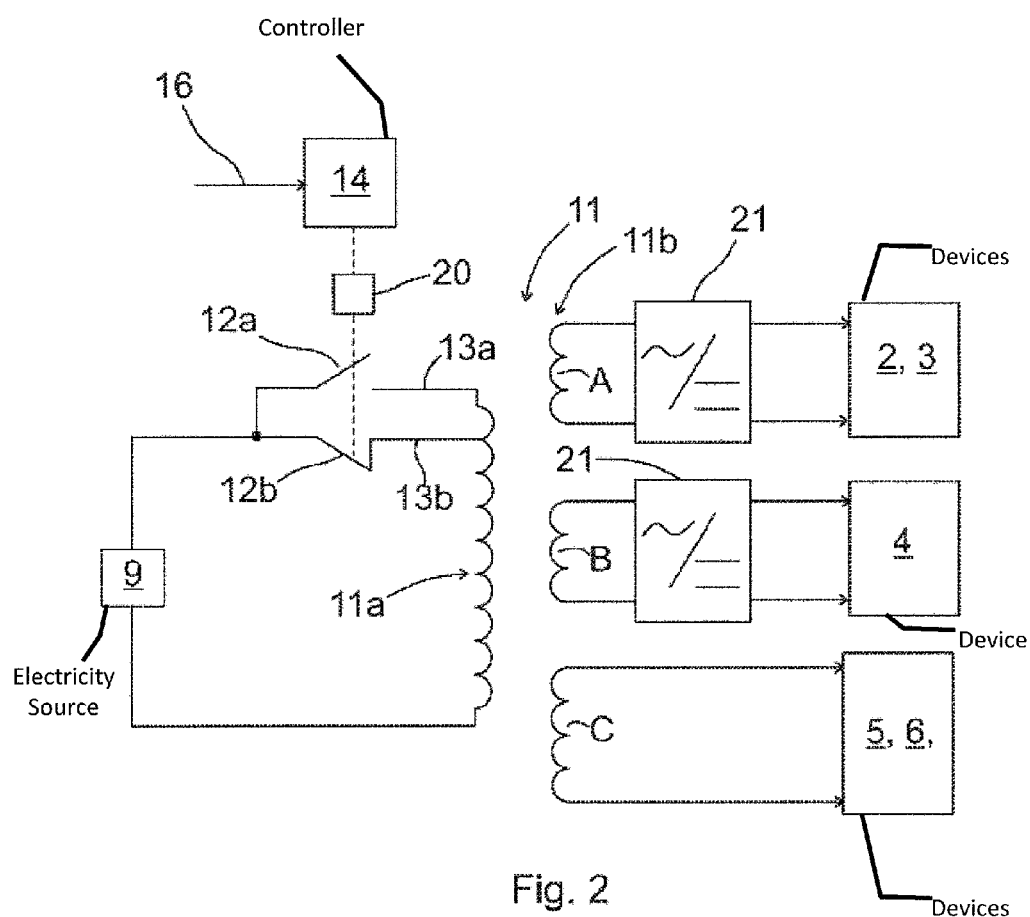
FIG. 2 presents with circuit diagram symbols an electricity supply apparatus according to the first embodiment of the invention

FIG. 2 presents in more detail one electricity supply apparatus 1 according to the first embodiment of the invention. The electricity supply apparatus 1 is suited for use e.g. in the electricity supply circuit of an elevator system according to FIG. 1a. The electricity supply apparatus 1 comprises a transformer 11, which comprises a primary 11a and three secondaries 11b. The secondaries 11b are connected to the electricity supply of the devices 2, 3, 4, 5, 6 of the elevator system. The supply voltage setting of the devices 2, 3, 4, 5, 6 of the elevator system is performed with tap switches 12a, 12b, which are connected to the taps 13a, 13b of the primary of the transformer. The primary 11a of the transformer is connected to the alternating electricity source 9 by means of tap switches 12a, 12b. The supply voltage to be used at any given time of the devices 2, 3, 4, 5, 6 of the elevator system in the secondaries 11b of the transformer is selected such that the nominal supply voltage is chosen by closing the second tap switch 12b and by opening the first tap switch 12a with a controller 14. The supply voltage in the secondaries 11b of the transformer is reduced to the minimum value 7a of the permitted supply voltage by opening the second tap switch 12b and by closing the first tap switch 12a with a controller 14, in which case the number of turns in the primary 11a of the transformer increases; in which case also the supply voltage in the secondaries 11b of the transformer decreases to the minimum value 7a of the lowest permitted supply voltage as the transformation ratio changes. In this embodiment of the invention the first 12a and the second 12b tap switch belong to the same switch module, such as to the relay module or contactor module, in which case the tap switches have a common control coil 20. The first tap switch 12a is preferably a normally-open contact and the second tap switch 12b is preferably a normally-closed contact, in which case when the position of the tap switches 12a, 12b corresponds to the power-saving mode, i.e. to the reduced supply voltage, current is supplied with the controller 14 to the control coil 20 that is common to the tap switches 12a, 12b.

If the alternating electricity source 9 of an elevator is three-phase, the primary 11a of the transformer is generally connected between two phases of the main voltage of the alternating electricity source 9; on the other hand, if the alternating electricity source is single-phase, the primary 11a can also be connected between one phase of the alternating electricity source and neutral. In this case the transformation ratio of the transformer 11 must, however, be dimensioned such that the required nominal voltage for the devices 2, 3, 4, 5, 6 of the elevator system to be supplied is achieved in the secondaries 11b.

In the transformer 11, nominal voltage of the magnitude of approx. 230 VAC is supplied from the secondaries 11b with the secondary C to the safety circuit of the elevator. The voltage to be supplied with the secondaries A and B is rectified with rectifying bridges 21 into DC voltage, the magnitude of which is a nominal voltage of approx. 24 VDC. The 24 VDC voltage to be supplied from the secondary B is taken to the elevator control unit(s) 4. The 24 VDC voltage to be supplied from the secondary A is taken to the devices 2, 3 of the elevator car and of the elevator hoistway. The secondary C of the transformer supplying the safety circuit of the elevator is also protectively earthed.

The controller 14 receives information 16 about the voltage magnitude of the alternating electricity source 9 of the elevator and when it detects reduced voltage of the alternating electricity source, e.g. at least of approx. 5-10%, the controller always selects with the tap switches 12a, 12b the larger of the supply voltages to be used, with which the supply voltage (s) is/are prevented from decreasing significantly below the minimum value 7a of the lowest permitted supply voltage.

The controller 14 can be physically disposed e.g. in the same device cabinet as the transformer 11/tap switches 12a, 12b; on the other hand, the controller can also be disposed e.g. in the elevator control unit 4, or the operation of the controller 14 can be integrated as a part of the control logic/software of the elevator control unit 4. The tap switches 12a, 12b can also be disposed in the same device cabinet with the transformer 11 or also separately from the transformer.

Embodiment 2

Figure 1B:
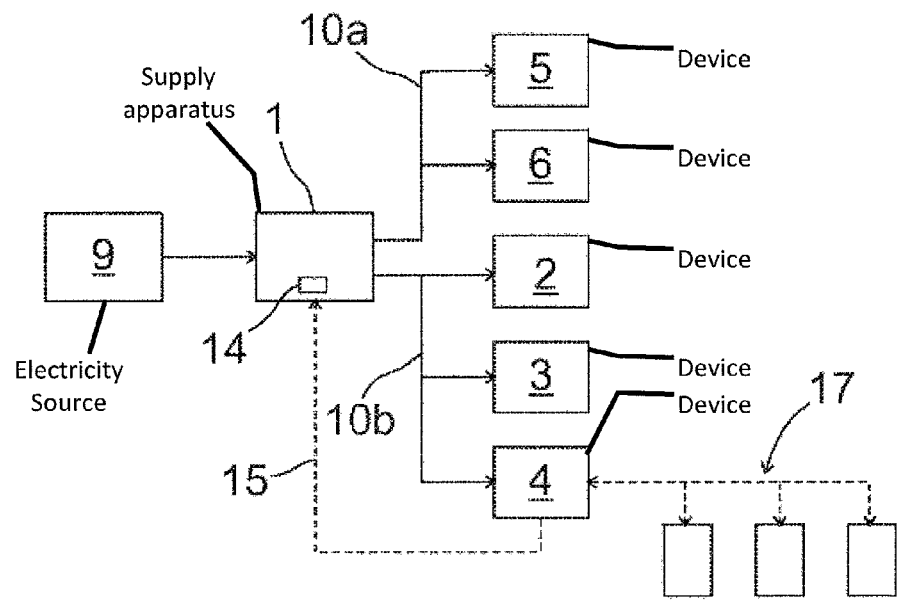
FIG. 1b presents a block diagram of an electricity supply circuit of an elevator system according to the second embodiment of the invention

FIG. 1b presents an electricity supply circuit of an elevator system as a block diagram, to which circuit the electricity supply apparatus 1 according to the second embodiment of the invention is adapted. Electricity supply to the different devices 2, 3, 4, 5, 6 of the elevator system occurs from an alternating electricity source 9 via the electricity supply apparatus 1. The devices/sets of devices to be supplied with the electricity supply apparatus 1 comprise e.g. the electrical devices/electronic devices 2 of the elevator car, the electrical devices/electronic devices 3 of the elevator hoistway, the elevator control unit(s) 4, and the safety circuit 5, 6 of the elevator.

In this embodiment of the invention the electricity supply apparatus 1 comprises two outlets 10a, 10b, via the first output 10a of which the electricity supply apparatus 1 supplies a constant voltage to the elevator safety circuit 5, 6 that is connected to the first output 10a, at the same time as the electricity supply apparatus 1 reduces the voltage to be supplied to the devices 2, 3, 4 of the elevator system that are connected to the second output 10b from the nominal voltage towards the minimum value 7a of the permitted voltage.

The elevator control unit 4 switches the elevator system to the standby mode after detecting that a certain time has passed since the previous elevator call was received. In this connection the elevator control unit 4 transmits an activation signal 15 of the power-saving mode to the electricity supply apparatus 1. As presented in FIG. 4, on the basis of the activation signal 15 of the power-saving mode, the electricity supply apparatus 1 reduces the supply voltage 8 of the devices 2, 3, 4 of the elevator system, which devices are connected to the second output 10b, from the nominal value of the supply voltage to the permitted minimum value 7a of the supply voltage at the moment of time 18. In this case the devices 2, 3, 4 to be supplied with the permitted minimum value 7a consume essentially less current/electrical power; at the same time, however, the electricity supply of the safety circuit 5, 6 of the elevator, which connection is important for the sake of safety, continues at the nominal voltage also during the power-saving mode. Those devices for which the voltage is reduced for the duration of the power-saving mode include e.g. the elevator control unit(s) 4 as well as the call-giving devices and display devices 17 of the elevator car and of the stopping floor.

After receiving a new elevator call from the call-giving devices 17, the elevator control unit 4 terminates the standby mode. In this case the elevator control unit 4 transmits a signal 15 to the electricity supply apparatus 1 for terminating the power-saving mode. The electricity supply apparatus increases the supply voltage of the devices 2, 3, 4 of the elevator system from the minimum value 7a of the permitted supply voltage back to the nominal voltage at the moment of time 19 after receiving the termination signal 15 of the power-saving mode.

In another embodiment of the invention the elevator control unit 4 transmits an activation signal 15 of the power-saving mode to the electricity supply apparatus 1 immediately after detecting that the elevator car has landed on the stopping floor and transmits a termination signal of the power-saving mode only slightly before the next run starts, in which case the supply voltage of the devices 2, 3, 4 of the elevator system is reduced to the minimum value 7a of the permitted supply voltage for most of the standstill of the elevator and thus the energy-saving to be achieved increases compared to before. This is enabled by the solution according to the invention because the devices 2, 3, 4 of the elevator system controlled to the power-saving mode remain ready-for-use also in the power-saving mode with the minimum value 7a of the permitted supply voltage and in connection with the recovery from the power-saving mode there is no need to take into account the delays caused by, among other things, restarting the devices. Thus, e.g. the use of the call-giving devices 17 controlled to power-saving mode is also possible during the power-saving mode.

Figure 3:
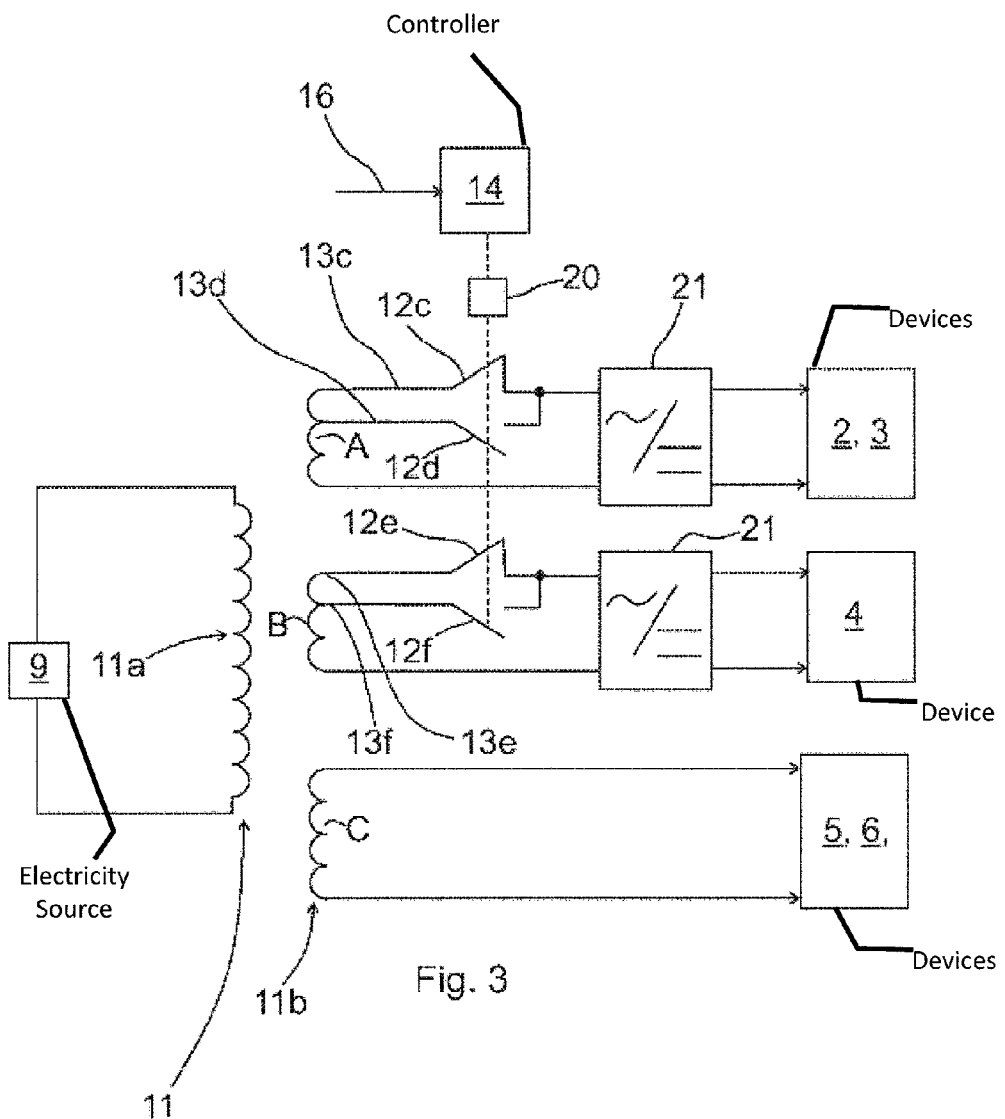
FIG. 3 presents with circuit diagram symbols an electricity supply apparatus according to the second embodiment of the invention

FIG. 3 presents in more detail one electricity supply apparatus 1 according to the second embodiment of the invention. The electricity supply apparatus 1 is suited for use e.g. in the electricity supply circuit of an elevator system according to FIG. 1b. The electricity supply apparatus 1 comprises a transformer 11, which comprises a primary 11a and three secondaries 11b, the secondaries A, B and C. The secondaries 11b are connected to the electricity supply of the devices 2, 3, 4, 5, 6 of the elevator system. The supply voltage setting of the devices 2, 3, 4 of the elevator system is performed with tap switches 12c, 12d, 12e, 12f, of which the tap switches 12c and 12d are connected to the taps 13c, 13d of the secondary A and the tap switches 12e, 12f are connected to the taps 13e, 13f of the secondary B. The secondary C supplies a constant voltage so that it is connected without tap switches to the devices 5, 6 to be supplied. Likewise, the primary 11a of the transformer is connected without tap switches to the alternating electricity source 9. The supply voltage of the devices 2, 3 of the elevator system to be connected to the secondary A of the transformer is selected such that the nominal supply voltage is selected by closing the first tap switch 12c and by opening the second tap switch 12d with a controller 14, in which case a maximum number of turns is obtained for the secondary A of the transformer. The supply voltage in the secondary A of the transformer is reduced to the minimum value 7a of the permitted supply voltage by opening the first tap switch 12c and by closing the second tap switch 12d with a controller 14, in which case the number of turns in the secondary A of the transformer decreases; in which case also the supply voltage in the output A decreases to the minimum value 7a of the lowest permitted supply voltage as the transformation ratio changes. The supply voltage in the secondary B of the transformer is selected in a corresponding manner with the tap switches 12e, 12f. In this embodiment of the invention the tap switches 12c, 12d, 12e, 12f belong to the same switch module, such as to the relay module or contactor module, in which case the tap switches have a common control coil 20. The tap switches 12c and 12e comprise preferably a normally-open contact and the tap switches 12d and 12f comprise preferably a normally-closed contact, in which case when the position of the tap switches 12c, 12d, 12e, 12f corresponds to the power-saving mode, i.e. to the reduced supply voltage, current is supplied with the controller 14 to the control coil 20 that is common to the tap switches; the power supply to the control coil 20 is disconnected when the power-saving mode is terminated. In the secondaries A, B the tap switches, on the other hand, can also comprise output-specific switch modules, in which case devices connected to different outputs can be controlled to the power-saving mode and the power-saving mode can be terminated in both outputs separately and, if needed, also at a different moment of time.

If the alternating electricity source 9 of the elevator is three-phase, the primary 11a of the transformer is generally connected between two phases of the main voltage of the alternating electricity source 9; on the other hand, if the alternating electricity source of the elevator is single-phase, the primary 11a can also be connected between one phase of the alternating electricity source and neutral. In this case the transformation ratio of the transformer 11 must, however, be dimensioned such that the required nominal voltage for the devices 2, 3, 4, 5, 6 of the elevator system to be supplied is achieved in the secondaries A, B and C.

A nominal voltage of the magnitude of approx. 230 VAC is supplied with the secondary C to the safety circuit of the elevator. The voltages to be supplied with the secondaries A and B are rectified with rectifying bridges 21 into DC voltage, the nominal voltage of which is approx. 24 VDC. The 24 VDC voltage to be supplied from the secondary B is taken to the elevator control unit(s) 4. The 24 VDC voltage to be supplied from the secondary A is taken to the devices 2, 3 of the elevator hoistway and of the elevator car. The secondary C of the transformer is also protectively earthed.

The controller 14 receives information 16 about the voltage magnitude of the alternating electricity source 9 of the elevator and when it detects reduced voltage of the alternating electricity source, e.g. at least of approx. 5-10%, the controller always selects with the tap switches 12d, 12d, 12e, 12f the larger of the supply voltages to be used, with which the supply voltage(s) is/are prevented from decreasing significantly below the minimum value 7a of the lowest permitted supply voltage.

The controller 14 can be physically disposed e.g. in the same device cabinet as the transformer 11/tap switches 12c, 12d, 12e, 12f; on the other hand, the controller can also be disposed e.g. in the elevator control unit 4, or the operation of the controller 14 can be integrated as a part of the control logic/software of the elevator control unit 4. The tap switches 12c, 12d, 12e, 12f can also be disposed in the same device cabinet with the transformer 11 or also separately from the transformer.

In the examples described above mechanical switches have been used as the tap switches 12a, 12b, 12c, 12d, 12e, 12f; also solid-state switches, such as IGBT transistors, MOSFET transistors, bipolar transistors, thyristors and/or solid-state relays can be used in addition to, or instead of, mechanical switches.

The electricity supply apparatus 1 according to the invention can also be in its structure e.g. an inverter or chopper circuit that is implemented with solid-state switches, such as an AC/DC transformer or DC/DC transformer.

Particularly if the alternating electricity source 9 of the elevator is single-phase, the electricity supply apparatus 1 can be provided with a controllable solid-state switch and a choke for performing power factor correction such that the electricity supply apparatus 1 controls the aforementioned solid-state switch in order to reduce the harmonics of the current of the alternating electricity source.

Instead of, or in addition to, the alternating electricity source, e.g. an accumulator, supercapacitor, fuel cell, flywheel, wind power generator or solar cell can be used as an energy source. The use of an additional energy source can also be useful, e.g. during an operational non-conformance of the alternating electricity source, in which case by means of the invention the operating time of the additional energy source can also be increased by reducing energy consumption.

The invention is described above in connection particularly with elevator systems; however, the invention is also suited for use in e.g. escalator systems and travelator systems.

The invention is not only limited to be applied to the embodiments described above, but instead many variations are possible within the scope of the inventive concept defined by the claims below.

The invention claimed is:

1. Electricity supply apparatus that supplies electricity to one or more devices in an elevator system;
    the electricity supply apparatus being configured to determine a minimum value of the permitted supply voltage with which a particular one of said one or more devices of the elevator system still operates;
    the electricity supply apparatus being configured to limit electricity consumption of the elevator system by changing the supply voltage of one or more devices of the elevator system towards the determined minimum value of the permitted supply voltage.

2. Electricity supply apparatus according to claim 1, the apparatus further comprising:
    two outputs,
    the electricity supply apparatus being configured to
        supply a constant voltage via a first of said two outputs to one or more devices of the elevator system and
        to simultaneously change, vie the second of said two outputs, the voltage to be supplied to one or more devices of the elevator system towards the determined minimum value of the permitted supply voltage.

3. Electricity supply apparatus according to claim 1 or 2, the apparatus further comprising:
    a transformer, the transformer including a primary and a secondary, the secondary being connected to an electricity supply of one or more devices of the elevator system;
    tap switches connected to taps of the transformer; and
    a controller configured to change the supply voltage of one or more of the aforementioned devices of the elevator system towards the determined minimum value of the permitted supply voltage by controlling the tap switches.

4. Electricity supply apparatus according to claim 3, wherein the primary of the transformer is connected to an alternating electricity source of the elevator.

5. Electricity supply apparatus according to claim 3, wherein the tap switches are connected to the taps of the primary of the transformer.

6. Electricity supply apparatus according to claim 3, wherein the tap switches are connected to the taps of the secondary of the transformer.

7. Electricity supply apparatus according to claim 6, the transformer further comprising: a separate secondary, which is connected without tap switches to the electricity supply of one or more devices of the elevator system.

8. Electricity supply apparatus according to claim 1, further comprising an input for a control signal of a power-saving mode.

9. Electricity supply apparatus according to claim 1, further comprising an input for data about a voltage of an alternating electricity source of the elevator.

10. Elevator system comprising:
    means for setting an operating mode of the elevator system;
    an electricity supply apparatus that supplies electricity to one or more devices in the elevator system;
    the electricity supply apparatus being configured to determine a minimum value of the permitted supply voltage with which a particular one of said one or more devices of the elevator system still operates; and the electricity supply apparatus being configured to limit electricity consumption of the elevator system by changing the supply voltage of one or more devices of the elevator system towards the determined minimum value of the permitted supply voltage;

the electricity supply apparatus being configured to change the supply voltage of one or more devices of the elevator system towards the determined minimum value of the permitted supply voltage in response to an operating mode indicating a limited electricity consumption of the elevator system.

11. Elevator system according to claim 10, wherein the electricity supply apparatus changes the supply voltage of one or more devices of the elevator system towards the determined minimum value of the permitted supply voltage in response to a determination that an elevator in the elevator system has stopped moving.

12. Elevator system according to claim 10 or 11, wherein the operating mode indicating a limited electricity consumption of the elevator system includes a standby mode of the elevator.

13. Elevator system according to claim 10, further comprising:

an elevator control unit that controls the operation of the elevator in response to elevator calls, and the electricity supply apparatus changes the supply voltage of the elevator control unit towards the determined minimum value of the permitted supply voltage in response to control of the operation of the elevator.

14. Method for limiting the electricity consumption of the elevator system, the method comprising:

identifying an operating mode of the elevator system;

determining a minimum value of a permitted supply voltage with which a particular one of one or more devices of the elevator system still operates; and adjusting the supply voltage of one or more of said devices of the elevator system towards the determined minimum value of the permitted supply voltage in order to limit the electricity consumption of the elevator system based on the identified operating mode.

* * * * *